June 26, 1928.  G. F. WOLFF  1,674,755
METAL WEATHER STRIP
Filed March 23, 1925
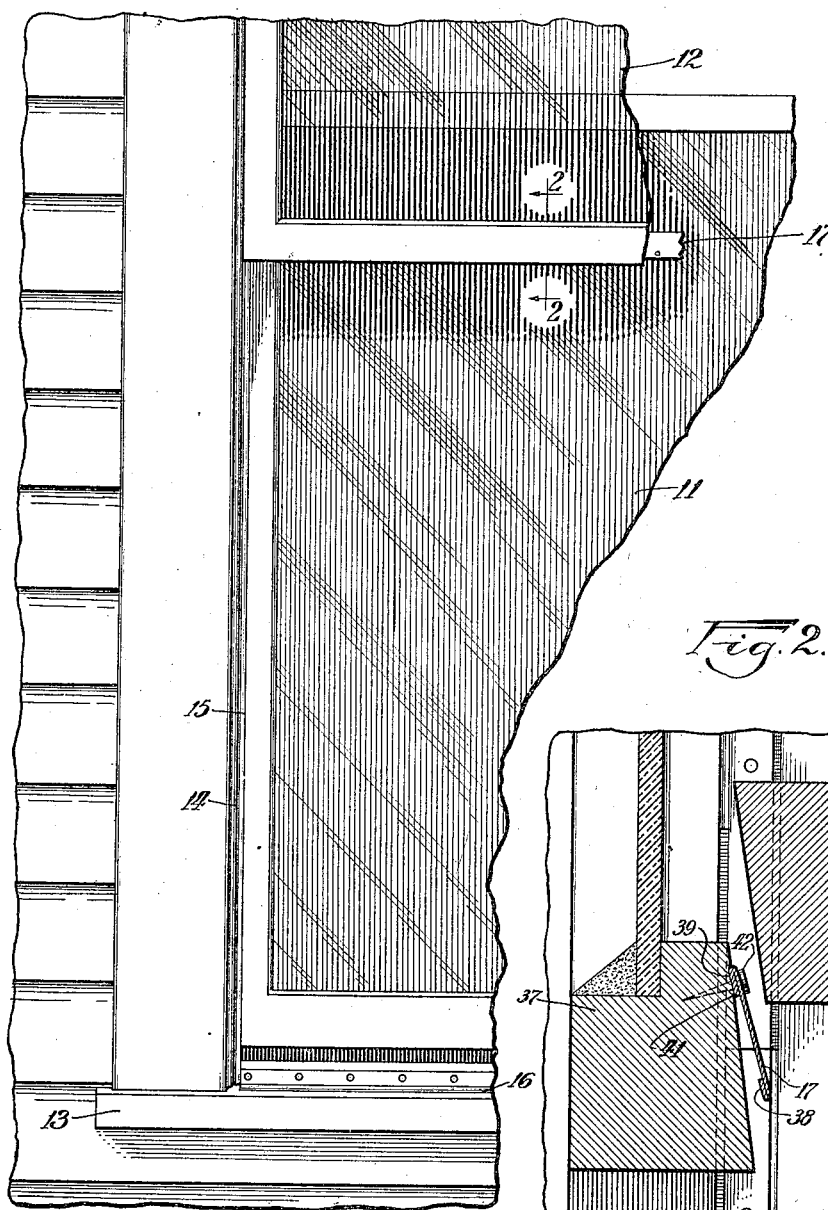
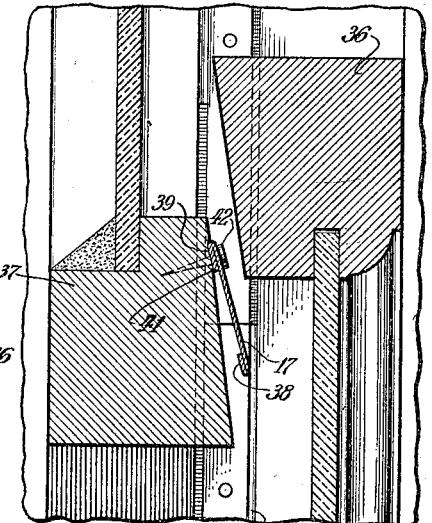
Inventor
George F. Wolff
By Munday, Clarke & Carpenter
Attys Patented June 26, 1928.

1,674,755

UNITED STATES PATENT OFFICE.

GEORGE F. WOLFF, OF CHICAGO, ILLINOIS, ASSIGNOR TO SAGER METAL WEATHER-STRIP CO., OF CHICAGO, ILLINOIS, A CORPORATION OF ILLINOIS.

METAL WEATHER STRIP.

Original application filed March 29, 1923, Serial No. 628,405. Divided and this application filed March 23, 1925. Serial No. 17,542.

This invention relates in general to weather stripping, and has more particular reference to weather stripping of sheet metal, more particularly shown and described in my co-pending application Serial No. 628,405, filed March 29, 1923, of which this application is a division.

A principal object of the present invention is the provision of weather stripping which will insure yielding pressure engagement at the meeting rails of the window sash and this is accomplished by flexible flanges bent or deflected by the casing of the window into tight weather proofing engagement.

Another important object of the present invention is the provision of weather stripping accomplishing the foregoing result, which may be made in continuous lengths and which may be cut and applied by the ordinary householder without the need of special equipment, complicated instructions, or any reformation or alteration of the parts of the window assembly.

Another and highly important object of the invention is the provision of weather stripping of this character, which may be cheaply made in continuous lengths and cut to desired dimension as an incident to the installation.

Another object of my invention is to provide a weather stripping having tightly hemmed edges whereby to form folded portions providing more effective sealing surfaces, wherein the stripping is bent slightly outwardly along a line parallel to and adjacent one of the hemmed edges, so that when the stripping is fastened to the flat surface of one of the meeting rails, the remainder of the strip will form a deflectable flange possessing the requisite resiliency for forming the seal between the meeting rails of the upper and lower sashes.

Another important object of the invention is the provision of weather stripping which will tightly seal the meeting rails of the window sashes without requiring any cutting or alteration of the parts, window sash or frame, and which will provide tight sealing thereof.

Numerous other objects and advantages of the invention will be apparent as it is better understood from the following description, which, taken in connection with the accompanying drawings, discloses a preferred embodiment thereof.

On the drawings,

Figure 1 is a fragmentary view of the window assembly showing the strips constituting the present preferred embodiment of the invention in position; and Fig. 2 is a partial section through the meeting rails.

Referring to the drawings, reference character 11 indicates the bottom sash, reference character 12 the upper sash, reference character 13 the sill, and reference character 14 the stop strips. Weather stripping members 15 are applied to the stop strips at the sides and top and weather stripping members 16 and 17 are applied respectively for engagement by the bottom of the lower sash and at the parting rails.

Fig. 2 discloses a preferred construction of the strip at the meeting rails, these rails being indicated by reference characters 36 and 37.

The strip 17 is hemmed at each edge at 38 and 39 and is bent slightly at 41. It will be noted that the line of bend 41 is disposed adjacent the edge of the in-turned hem portion 39 by which construction a greater effective resiliency is produced due to the extra thickness at this point and also because this in-turned edge provides a predetermined line for uniformly fixing the line of bend at this point which is that extreme end of the strip removed from the hemmed edge 38. Brads or tacks 42 may be employed to fasten the upper edge of the strip to the inner face of the upper sash. The bend 41 causes the strip to stand away from this face of the sash so that the body of the strip is formed into a deflectable flange engageable by the outer face of the meeting rail of the lower sash when the window is closed.

It will thus be manifest that all of the strip parts are provided with yielding deflectable flanges, which do not require for their sealing action any particular formation or grooving of any of the window parts, and it will be manifest also that the strips may be made in long lengths and cut by the user through the employment of shears or other suitable and readily available devices.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A metal weather stripping adapted for attachment to the flat face of the meeting rail of a window, comprising, a flat metal strip having its edges tightly hemmed so as to provide relatively narrow thickened portions at each edge, one of which thickened portions is adapted to receive fastening means therethrough to connect the strip to the meeting rail, said metal strip being bent on a line parallel and adjacent to one of the hemmed edges and in a direction away from the face of the metal on which the turned-over edge lies.

GEORGE F. WOLFF.